United States Patent [19]

Bedard

[11] Patent Number: 5,801,747
[45] Date of Patent: Sep. 1, 1998

[54] METHOD AND APPARATUS FOR CREATING A TELEVISION VIEWER PROFILE

[75] Inventor: Karen Bedard, San Jose, Calif.

[73] Assignee: Hyundai Electronics America, San Jose, Calif.

[21] Appl. No.: 751,537

[22] Filed: Nov. 15, 1996

[51] Int. Cl.[6] .................................................. H04N 7/17
[52] U.S. Cl. ......................................... 348/1; 348/10
[58] Field of Search ............................... 348/1, 2, 5, 6, 348/10, 468, 473, 553, 569, 406

[56] References Cited

U.S. PATENT DOCUMENTS

| | | |
|---|---|---|
| 4,566,030 | 1/1986 | Nickerson et al. ........................... 348/1 |
| 4,591,840 | 5/1986 | Curtis et al. . |
| 4,663,615 | 5/1987 | Hernandez et al. . |
| 4,977,455 | 12/1990 | Young . |
| 5,151,789 | 9/1992 | Young . |
| 5,353,121 | 10/1994 | Young et al. . |
| 5,382,970 | 1/1995 | Kiefl ........................................... 348/1 |
| 5,477,262 | 12/1995 | Banker et al. . |
| 5,479,266 | 12/1995 | Young et al. . |
| 5,479,268 | 12/1995 | Young et al. . |
| 5,532,754 | 7/1996 | Young et al. . |
| 5,539,479 | 7/1996 | Bertram . |
| 5,550,576 | 8/1996 | Klosterman . |
| 5,559,550 | 9/1996 | Mankovitz . |
| 5,585,838 | 12/1996 | Lawler et al. . |
| 5,585,866 | 12/1996 | Miller et al. . |
| 5,635,989 | 6/1997 | Rothmuller ............................... 348/563 |
| 5,694,176 | 12/1997 | Bruette et al. ........................... 348/569 |
| B1 4,706,121 | 12/1993 | Young . |

FOREIGN PATENT DOCUMENTS

| | | |
|---|---|---|
| WO 91/07050 | 5/1991 | WIPO . |
| WO 92/04801 | 3/1992 | WIPO . |
| WO 94/29811 | 12/1994 | WIPO . |
| WO 95/07003 | 3/1995 | WIPO . |
| WO 95/28799 | 10/1995 | WIPO . |
| WO 95/31069 | 11/1995 | WIPO . |

*Primary Examiner*—Mark R. Powell
*Assistant Examiner*—Reuben M. Brown
*Attorney, Agent, or Firm*—Pennie & Edmonds LLP

[57] ABSTRACT

A method and apparatus are disclosed for monitoring television viewing activity to determine preferred categories of programming and preferred channels of a viewer. To facilitate viewer access to preferred programming, the display of an electronic program guide may be configured in accordance with the monitored viewing activity to provide fast access to the preferred programming. The monitored viewing activity may also be used to provide a lock-out feature to prevent or limit the viewing of specified channels or categories of programming, or to identify and provide information of interest from the internet. In yet another embodiment of the invention, a viewer may automatically circulate through his or her preferred programming, as determined by monitoring the viewing activity of that viewer.

17 Claims, 5 Drawing Sheets

FIG.1

| CHANNEL | TOTAL UNITS | MOVIES | NEWS | SHOWS | SPORTS | CHILDREN | MUSIC | ARTS | SOCIAL | EDUCATION | LEISURE |
|---|---|---|---|---|---|---|---|---|---|---|---|
| ESPN | 20 | | 5 | | 15 | | | | | | |
| BRV | 32 | 20 | | | | 4 | 4 | 4 | | | |
| SC | 50 | | 4 | | 30 | | | | | | 16 |
| DSC | 24 | | | 8 | | | | | | 4 | 4 |
| TOTALS | 126 | 20 | 9 | 8 | 45 | 4 | 4 | 4 | | 12 | 20 |

# METHOD AND APPARATUS FOR CREATING A TELEVISION VIEWER PROFILE

BACKGROUND OF THE INVENTION

1. Technical Field

The present invention relates to the presentation of television programs and television program guide information to a television viewer. More particularly, the present invention relates to a method and apparatus for tailoring on-screen program listings and program selections based upon a viewer's past viewing behavior.

2. Discussion of the Related Art

Television viewing is a popular activity, and the number of available television channels has grown substantially since the early days of broadcast television, thereby providing viewers with greatly increased choices in programming. Programming guides have become important viewer tools, and indeed, are essential for efficiently locating desired programs.

Paper guides, such as those provided with newspapers, are plentiful but suffer from many drawbacks. These drawbacks include possible preemption after printing and the sheer amount of information placed before the reader with little, if any, visual distinction between programs. A reader interested in only a subset of the available programming is forced to search the entire listing to locate the desired program or programs.

More recent alternatives to paper guides, known as Electronic Program Guides ("EPG"), have been developed. EPGs provide television program listings directly on the viewer's television screen, and generally eliminate the possibility of relying on an obsolete guide because the program listings can be updated in real-time by the EPG provider. U.S. Pat. No. 5,353,121 issued Oct. 4, 1994 to Young discloses just such an EPG, wherein information is displayed on the viewer's television screen.

These known EPGs not only provide on-screen program listings, but also allow a viewer to tune to a desired program, if such program is listed in the program guide, by interacting with the EPG via a remote control instead of manually changing channels. EPGs typically present the television listings in a grid format and give the viewer control over a cursor or pointer with which to make selections. The grid may be organized in such a manner that one axis represents time and the other represents programming channels. Such grids typically present the program channels in a sequential manner such as numeric order by channel number or alphabetic order by programming source or other identifier.

Although known EPGs grant viewers the convenience of identifying available television programs without resorting to other sources of information, shortcomings still exist. For example, a viewer who greatly prefers sports programs over other programming will still have to search the entire grid of available programs to find those involving sporting events of interest. Further, although some televisions and television scheduling systems allow viewers to pre-specify certain channels as "favorite" channels, not every viewer of a given television receiver will prefer the same favorite channels, and any one viewer's favorites may change over time, thereby reducing the effectiveness of that feature. In addition, known EPGs do not provide means for limiting the amount of time that a particular channel or particular category of television programming may be viewed, such as a parental lock-out feature based not only on the type of programming, but on viewing time as well. Known EPGs also do not provide a means for identifying and providing information of interest from the internet based upon a viewer's past television viewing behavior.

SUMMARY OF THE INVENTION

In view of the above disadvantages of the related art, it is an object of the present invention to provide a method and apparatus for monitoring a viewer's viewing activities, determining not only the viewer's favorite channels, but also the viewer's preferred categories of programming, and configuring the display of an Electronic Program Guide ("EPG") or other suitable guide system in accordance with the viewer's viewing preferences.

In accordance with the present invention, a novel method and apparatus is provided for monitoring television viewing behavior and determining viewer preferences. This novel method and apparatus may illustratively be used to configure and display electronic program guide information on the screen of a television in accordance with viewer preferences, regulate the amount of time certain television programming is viewed, automatically switch through preferred programming options for ease of viewer selection, or identify and provide information of interest from the internet.

In one exemplary embodiment of the invention, an apparatus for monitoring viewing behavior is provided which includes a means for establishing of a viewer profile for storing preferred viewing statuses. The apparatus further includes a means for calculating a time duration of a viewing status, determining whether the viewing status is included in the viewer profile listing, and adding the time duration of the viewing status to a total viewing time counter for that status if it is included in the viewer profile listing. If the viewing status is not included in the viewer profile listing, this novel apparatus will add the viewing status and the time duration of the viewing status to the same.

If the viewer profile listing is full, the apparatus will remove a least preferred viewing status from the listing to make room for the new viewing status. However, only viewing statuses greater than a predetermined length will be considered for inclusion into the viewer profile listing.

In another aspect of the invention, a viewer's preferred categories of programming may be determined. In this aspect of the invention, the time duration of each viewing status is divided into a predetermined number of categories of television programming, and added to category time viewing counters corresponding to each such category.

BRIEF DESCRIPTION OF THE DRAWINGS

The features and advantages of the present invention will be better understood by reference to the following detailed description, which should be read in conjunction with the accompanying drawings in which.

DETAILED DESCRIPTION OF THE INVENTION

The following embodiments of the present invention will be described in the context of Electronic Program Guides ("EPG") and general television viewing, although those skilled in the art will recognize that the disclosed methods and structures are readily adaptable for broader application.

A television viewing environment typically incorporates a television, a viewer interface, a viewer interface remote control, and one or more viewers. Viewer interfaces are known in the art, and are generally found in the form of a television set-top unit. The viewer interface is often connected to, and between, the television and television program/broadcast sources such as cable and satellite. The viewer interface receives input in the form of television programs and television program guide information from the various broadcast sources. The viewer interface may also perform additional functions such as decoding and encoding of the television programming.

For the purpose of describing the present invention, the viewer interface additionally includes an EPG. However, one skilled in the art will understand that an EPG could be implemented in a variety of ways, including within the television or as part of an interactive television network coupled to the viewer interface. An example of a suitable EPG is disclosed in U.S. application Ser. No. 08/556,624, entitled "Electronic Program Guide with Enhanced Presentation", and filed Nov. 13, 1995, which is incorporated herein by reference.

The viewer interface also includes a means for accepting viewer commands, such as to change television channels, from the remote control. However, the remote control is merely one means by which a viewer may input commands to the viewer interface and/or the EPG. For example, viewers may input commands directly into the viewer interface.

In accordance with the present invention, a viewer profile is provided for use in the above-described television viewing environment that will monitor a viewer's viewing behavior to determine the viewer's preferred channels and the types or categories of television programming that the viewer prefers on those channels. The viewer profile of the present invention possesses several advantages over the prior art. Drawing upon its stored information, the viewer profile will operate in conjunction with a remotely controllable EPG and can be instructed to surf through the viewer's preferred channels automatically or through those channels currently showing the viewer's favorite category or categories of programming. Additionally, the information captured by the viewer profile can be used to tailor the EPG's presentation of television program guide information so as to provide faster access to information concerning the viewer's preferred channels and/or programming categories. Further, because the viewer profile can store profiles of numerous viewers, the tailored programming lists can be viewer-specific. In addition, the viewer profile can be used to lock out specified channels or categories of programming, or to limit the amount of time such channels or categories may be viewed. The viewer profile can also be used to identify and provide information of interest from the internet.

The viewer profile may be implemented in software and, like the EPG, downloaded into the viewer interface via an interactive television network or other means for loading software. In another exemplary embodiment, the viewer profile may be implemented as resident software in the viewer interface.

While monitoring viewing behavior, the viewer profile will consider short durations of viewing any one channel to be insignificant. Such short viewing durations could result, for example, from a viewer surfing through numerous channels without stopping on any one channel for a significant period of viewing time. By ignoring insignificant viewing periods, the viewer profile is able to focus upon a viewer's true interests and prevent numerous short unrepresentative viewing durations from skewing the data concerning the viewer's true preferences. The viewer profile will thus only consider significant those viewing periods longer than one viewing unit. One skilled in the art will understand that the time duration represented by one viewing unit can be varied (e.g., 1 minute, 5 minutes, 10 minutes, etc.), but illustratively, and for the purpose of describing the present invention, one viewing unit will be defined as fifteen minutes in duration. Therefore, only viewing durations longer than one viewing unit, or fifteen minutes, will be considered in determining the viewer's preferred categories of television programming and preferred channels.

Figure 1:
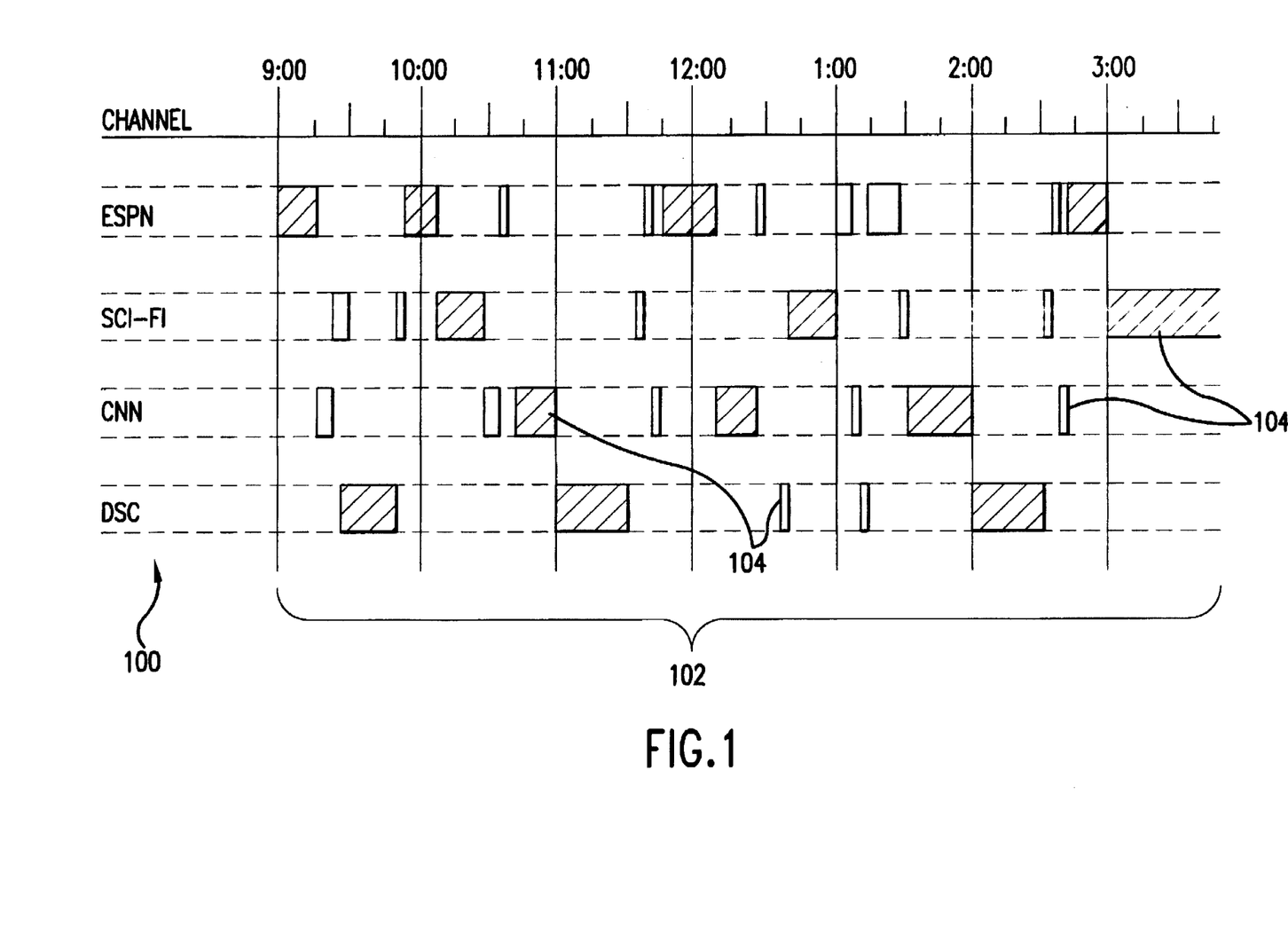
FIG. 1 portrays a hypothetical viewer's viewing behavior for a short period of time.

In accordance with the foregoing, FIG. 1 discloses a hypothetical viewer's actual viewing behavior before being filtered and stored by the viewer profile. Channels 100 are the television channels viewed by the viewer during depicted time period 102. Each viewing duration 104 reflects the channel viewed and the elapsed time. Although discussed in conjunction with a single hypothetical viewer's viewing behavior, one skilled in the art will recognize that the present invention is not limited to use with one viewer. The viewer profile, as disclosed herein, can monitor and store preference information on multiple viewers, either alone or in conjunction with an Electronic Program Guide.

Figure 2:
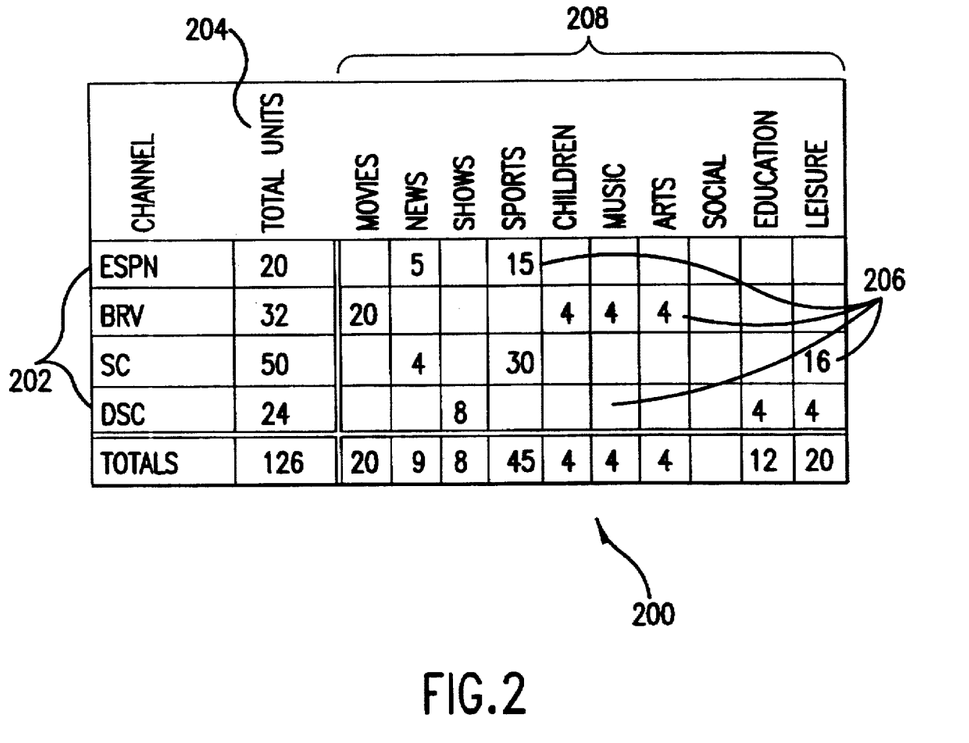
FIG. 2 depicts a viewer profile array showing the information that could be stored by the viewer profile for an extended period of viewing.

FIG. 2 discloses a viewer profile array 200 stored by the viewer profile in a storage means as a result of a hypothetical viewer's extended viewing history. It will be appreciated that viewer profile array 200 could be embodied as one of a number of types of data storage devices, such as a two-dimensional array or a linked list. Viewer profile array 200 contains entries 202 representing television channels viewed for at least one viewing unit. More specifically, entries 202 in viewer profile array 200 at any given time represent the determination by the viewer profile of the viewer's preferences at that time.

The time period over which the viewer profile monitors a viewer's viewing behavior and collects data may be termed the viewer profile collection period. A viewer profile collection period will always commence when a new viewer profile is created. The viewer profile collection period may be illustratively reinitialized in response to a viewer's command, for example, if a viewer substantially and rapidly changes viewing preferences, or may be automatically reinitialized at appropriate time intervals (e.g., one month or one year). However, the viewer profile collection period will only terminate upon reinitialization.

Each entry 202 has an associated total viewing unit counter 204 and one or more individual category or subcategory viewing unit counters 206. For a viewer's viewer profile collection period, total viewing counter 204 of entry 202 represents the total number of viewing units the viewer viewed the corresponding channel represented by entry 202. Subcategory viewing unit counters 206 represent the number of viewing units during the viewer profile collection period the viewer viewed the associated category 208 programming on the corresponding channel of an entry 202. Categories 208 represent various possible types of television programming. Within each category 208 there may be one or more subcategories. For example, under the category of movies there may be subcategories for adventure, comedy, science fiction, etc. By monitoring subcategories in addition to categories 208, the viewer profile can provide even more accurate information on viewer behavior.

The number of possible entries 202 in array 200 may be limited. In one embodiment of the invention, the limit is set to a percentage of the available television channels, illustratively 10%. In yet another embodiment of the invention, the number of entries 202 may have a set numeric limit, such as eight. However, one skilled in the art will understand that any suitable means for limiting the number of entries 202 in array 200 may be used.

Figure 3:
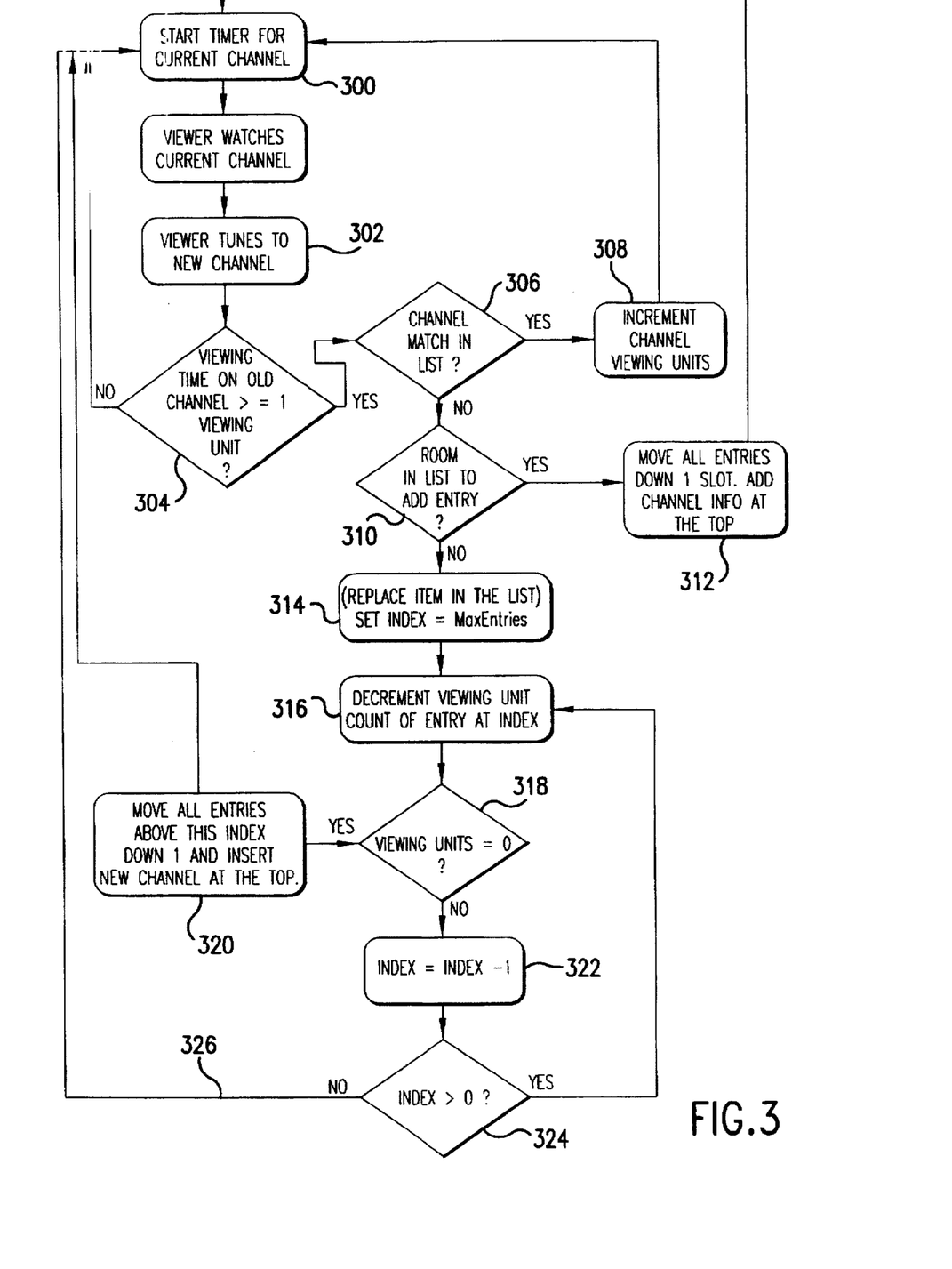
FIG. 3 is a flowchart demonstrating a preferred algorithm for managing the viewer profile array.

When a channel of channels 100 is eligible to become a viewer profile entry 202 (i.e., more than one viewing unit during the viewer profile collection period) and viewer profile array 200 is already full, a novel method, described below in conjunction with FIG. 3, is provided for resolving the conflict. In practice though, viewers tend to concentrate on a limited number (less than the limit on the number of viewer profile entries 202) of favorite channels.

Viewer Profile Array Management

Viewer profile array 200 is automatically populated with entries 202 as a viewer views, for more than one viewing unit, a new television channel that is not already included in viewer profile array 200. However, because the viewer profile monitors viewers' current favorite channels, when viewer profile array 200 is fully populated, there must be some method to replace old entries with new favorite channels. FIG. 3 depicts an advantageous method by which the viewer profile manages viewer profile array 200. The method depicted in FIG. 3 utilizes a weighted least recently used algorithm to retire viewer profile entries 202 and make room for a new channel. While the least recently used algorithm depicted in FIG. 3 is described herein as an exemplary embodiment of the present invention, one skilled in the art will recognize that other similar algorithms may be used to monitor viewing behavior and determine viewer preferences and still fall within the scope of the present invention.

Referring now to FIG. 3, a viewer profile timer is initiated at step 300 when a television viewer commences viewing a channel. When the viewer tunes (step 302) to a different channel, the viewer profile examines the timer to determine how much time has elapsed (step 304). If the timer indicates that less than one viewing unit has elapsed, no further action is taken and the viewer profile simply restarts the timer (step 300). If, however, the timer indicates that one or more viewing units has elapsed, then the viewer profile determines at step 306 whether the viewed channel is already in the viewer profile array 200. If the viewed channel is already an entry 202 in array 200, viewing unit counters 204 and 206 of entry 202 are incremented (step 308) by one or more viewing units, and the viewer profile then restarts (step 300) the timer for the new channel.

If the viewed channel is not already an entry 202 in viewer profile array 200, the viewer profile searches (step 310) for room in the viewer profile array 200 for a new entry 202. If there is room in array 200, the viewer profile will move (step 312) all existing entries 202 down one position in array 200, insert the new entry 202 at the top of array 200, and restart (step 300) the timer for the new channel. By placing the new entry 202 at the top of viewer profile array 200, it should be evident that the most recently viewed entries will be located at the top of array 200.

If there is no room in viewer profile array 200 for new entry 202, then new entry 202 must replace an existing entry. The viewer profile will start (step 314) at the bottom entry in array 200 and decrement (step 316) total viewing units counter 204 for that entry 202 by one, and then examine (step 318) whether counter 204 for that entry has reached zero (subcategory viewing unit counters 206 are not decremented). If counter 204 has reached zero, the viewer profile will move (step 320) all entries 202 down one position and insert the new entry 202 at the top of array 200. Again, this demonstrates how this novel method is weighted as far as viewer preference toward the most recently viewed entries 202. If, however, decrementing total viewing units counter 204 at step 316 for bottom entry 202 does not reduce counter 204 to zero, the viewer profile must continue to search for an entry 202 that is old enough to be removed from viewer profile array 200.

Therefore, the viewer profile will (steps 322 and 324) move up to the next higher entry 202 in viewer profile array 200, so long as the viewer profile is not already at the top of array 200. The viewer profile will then decrement (step 316) and examine (step 318) total viewing counter 204 for the next higher entry 202. The viewer profile will continue in this manner (steps 322, 324, 316, and 318) until it has either visited every entry 202 in viewer profile 200 or decremented a total viewing units counter for a particular entry to zero. If the viewer profile traverses the entire viewer profile array 200 without having decremented the total viewing unit counter 204 to zero for any entry 202, the viewer profile will abandon (step 326) its attempt to add new entry 202 to viewer profile array 200.

In this manner, a viewer profile array 200 is created wherein the order of entries 202 indicates which channels have been most recently viewed, while the corresponding counters 204 and 206 indicate the length and frequency of visits to the various channels in array 200.

In yet another alternative exemplary embodiment of the present invention, instead of performing only one cycle (i.e., one visit to each entry 202 in viewer profile array 200 in an attempt to add a new entry 202 to array 200), the viewer profile may make multiple cycles through array 200, where, for example, the number of cycles may be dependent upon the number of viewing units that the channel represented by new entry 202 has been viewed. This alternative embodiment allows the relevance of potential new entry 202 to be weighed against the relevance of existing entries 202 on the basis of the amount of time the corresponding channels have been viewed during the viewer profile collection period. This may be helpful, for example, in the event that potential new entry 202 is viewed for a substantial period of time (i.e., several viewing units) while the total viewing unit counters 204 of the current entries 202 are much lower, for example, two viewing units. Thus, this alternative embodiment ensures that a heavily-viewed new entry 202 is not arbitrarily dismissed as insignificant.

In this alternative embodiment, when new entry 202 is identified at step 304, a new entry viewing units counter (not shown) is initialized and set equal to the number of viewing units that the channel represented by new entry 202 had been viewed. Then, each time the viewer profile cycles through viewer profile array 200 (steps 314 to 324), the new entry viewing units counter would be decremented by one. If the new entry viewing units counter was decremented to zero before the total viewing units counter 204 for any entry 202 in array 200 was decremented to zero, then the attempt to add new entry 202 to array 200 would be abandoned at step 326. If, however, total viewing units counter 204 for an entry 202 in array 200 was decremented to zero at steps 316, 318 before new entry viewing units counter was decremented to zero, then the viewer profile would continue at step 320 an add new entry 202 to array 200.

In yet another exemplary embodiment of the present invention, after one unsuccessful cycle (steps 314 to 326, except step 320) through viewer profile array 200, the viewer profile will simply remove the oldest entry 202 that has a viewing units counter lower than that of the entry to be added, if one exists, in order to make room for a new entry 202 that has a new entry viewing units counter greater than one. This alternative embodiment avoids decrementing the counters, over multiple cycles, for all the other existing entries and thus de-emphasizing the importance of these entries as compared with future entries to be added.

Use of the Viewer Profile Array

Figure 4:
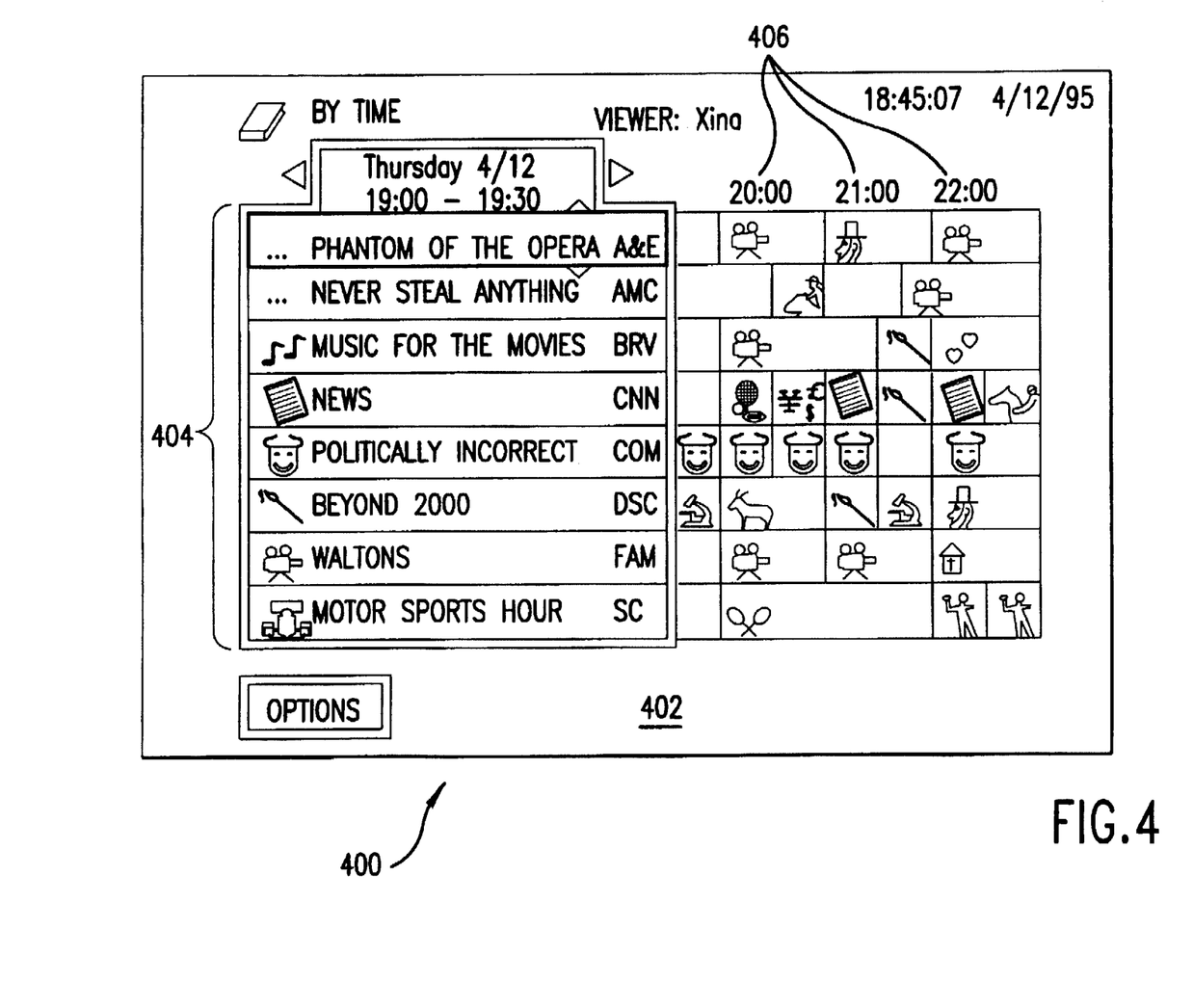
FIG. 4 is a television program listing displayed by an Electronic Program Guide.

FIG. 4 demonstrates how a typical Electronic Program Guide display 400 may appear without using the novel viewer profile of the present invention. Display 400 consists of a table 402 containing rows 404 representing available television channels and columns 406 representing time periods. The order in which the available channels appear in rows 404 is alphabetical by channel name. It can be seen in FIG. 4 that a viewer who prefers viewing, for example, the SCI-FI channel or VH-1, will have to scroll through the entire table 402 to learn what is offered on the viewer's preferred channels.

In accordance with the present invention, the information captured by the viewer profile can be used by an EPG to tailor display 400 so as to provide faster access to information concerning the viewer's preferred channels and/or programming categories. Thus, rows 404 may be configured by an EPG in accordance with the viewer profile such that preferred channels or preferred categories of programming are displayed at the top of table 402, and may be easily selected by a viewer.

Figure 5:
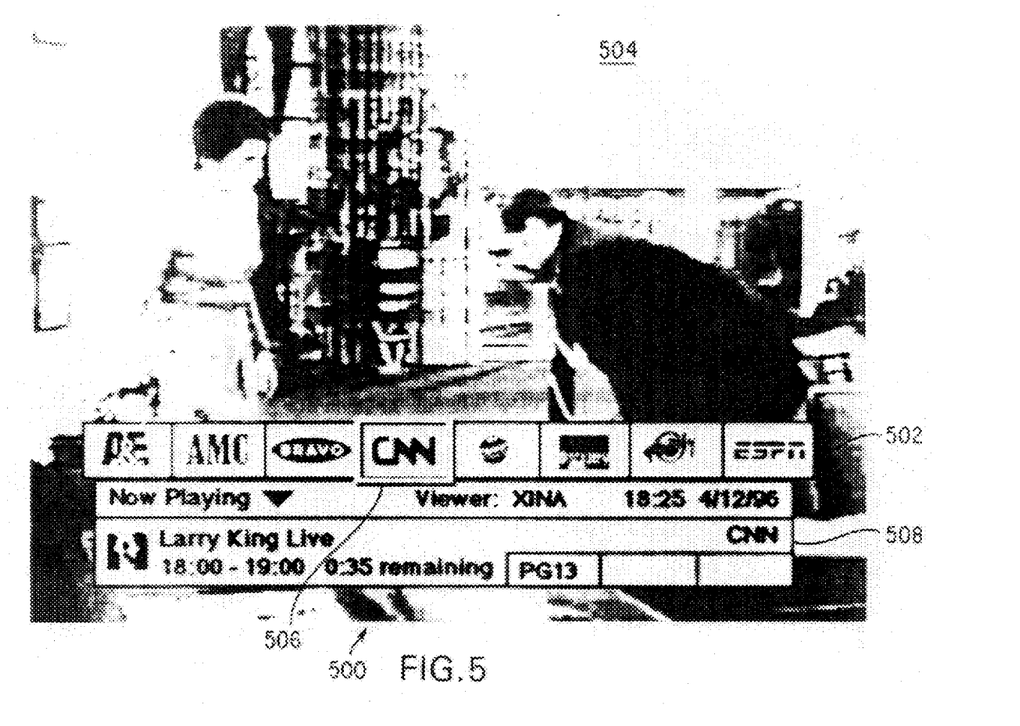
FIG. 5 is an Electronic Program Mini-Guide with primary programming displayed in the background.

FIG. 5 illustrates an alternative embodiment of a display 500 of an electronic program guide. As shown in FIG. 5, channels may be aligned in a row 502, overlayed upon primary television display 504, with one channel 506 selected, through a cursor, at a time. Like the EPG of FIG. 4, the channels are listed alphabetically by channel name. The currently selected television program on channel 506 is identified in an information box 508 below channel 506. Using the viewer interface remote control, a viewer can examine each channel 506 while viewing primary television display 504.

The EPG of FIG. 5 can operate in conjunction with the viewer profile of the present invention to organize the individual channels in row 502 by viewer preference. The viewer profile of the present invention may also be used by the EPG to automatically surf through the viewer's preferred channels or through those channels presently showing the viewer's favorite category or categories of programming. Thus, the viewer profile of the present invention, in conjunction with the EPG of FIG. 5, can receive and execute a viewer-initiated command to surf automatically, without further viewer intervention, through the television channels represented by current entries 202 in viewer profile array 200. This allows a viewer to glimpse the programs currently playing on the viewer's favorite channels or the programs in the viewer's favorite categories with only one keypress of the remote control and stop surfing on one of these favorite channels with one more keypress. One skilled in the art will understand that views of the preferred channels being surfed through need not occupy the entire display of the television. Thus, for example, as shown in FIG. 5, a cursor may automatically step through the viewer's preferred channels while the viewer is still watching primary television display 504. However, the viewer profile of the present invention may also be used to step through preferred channels in primary display 504 with no EPG displayed on the television screen.

The novel method and apparatus of the present invention may also be used to lock out specified channels or categories of programming, or to limit the amount of time such programming is viewed. An improvement upon parental lock-out features already known in the art, the present invention allows the locking out of certain channels based on time parameters, thereby allowing the viewing of certain channels and/or categories of viewing to be limited to a set amount of viewing units per time period.

Thus, for example, a viewer can be limited to only four hours of sporting events per week. Once the viewing unit counters of array 200 indicate that four hours of sporting events have been accumulated, the viewer will be prohibited from watching any further sporting events for that particular week. This novel lock-out feature is particularly advantageous to parents of small children, who may want to limit the categories of programs that may be viewed and the viewing time of such categories.

In yet another exemplary embodiment of the present invention, the information stored in viewer profile array 200 is made available to interested broadcasters. The broadcasters in turn use the information to more appropriately target certain types of programming and commercials to certain individuals or communities.

Viewer profile array 200 can also be used to identify channels that a viewer has not been watching, but that contain content the viewer might find interesting. Thus, for example, if from the viewer profile it is determined that a particular viewer enjoys watching movies, the viewer will be notified when movies are showing on channels not commonly watched by that viewer. These channels may be identified automatically on a periodic basis, or could be provided upon a viewer request.

Similarly, viewer profile array 200 can be used to identify and provide information from the internet, including the world wide web, to the viewer. This application of the viewer profile is highly advantageous as the delivery models of a personal computer and a television are on opposite ends of the interactive spectrum. More particularly, the personal computer is a "pull" model medium, in that the personal computer does nothing until the user boots up the computer and enters appropriate commands. Each user command may produce lengthy interactions, but regardless of length, the user controls the navigation and presentation of information. Simply put, the user "pulls", the information from the personal computer or the internet.

Unlike the personal computer, the television is a "push" model medium, in that television broadcasts are pushed at the consumer. Except for the ability to change channels or purchase on demand videos, the viewer does not control the information stream from the broadcaster. This "push" model is desirable in the entertainment industry where surprise is the key to engaging the audience.

Accordingly, keeping track of viewing habits through viewer profile array 200 is instrumental in combining the features of the television and the internet without relying on the personal computer "push" model of interaction. As explained herein, the viewer profile is a compilation of the most recently viewed and most often viewed channels, programming categories, and programming subcategories for each viewer. This viewer profile information can be used, in conjunction with for example a known internet search engine, to search for and "pull" information from the internet that might be interesting to a particular viewer. The located information may then be "pushed" at the viewer in accordance with the television model of interaction.

The information pulled from the internet may be presented to the viewer in a variety of formats. For example, a small icon on the television screen can appear discreetly whenever something of interest is available. Alternatively, a running banner across the screen can appear giving small pieces of information about additional information available on the internet.

Various embodiments of the invention have been described. The descriptions are offered by way of illustration, not limitation. Thus, it will be apparent to those skilled in the art that modifications may be made to the invention as described without departing from the scope of the claims set out below.

What is claimed is:

1. A method of monitoring television viewing behavior to determine viewer preferences, comprising the steps of:

establishing a viewer profile listing for storing a predetermined number of preferred viewing statuses;

calculating a time duration of a first viewing status;

determining whether said first viewing status is included in said viewer profile listing;

adding the time duration of said first viewing status to a total viewing time counter for said first viewing status in said viewer profile listing if said first viewing status is included in said viewer profile listing; and adding said first viewing status and said time duration of said first viewing status to said viewer profile listing if said first viewing status is not included in said viewer profile listing.

2. The method of claim 1, further comprising the step of:

removing a least preferred viewing status from said viewer profile listing if said viewer profile listing is full when said first viewing status is to be added to said viewer profile listing.

3. The method of claim 1, further comprising the steps of:

comparing the time duration of said first viewing status to a predetermined time unit; and adding the time duration of said first viewing status to said viewer profile listing only if said time duration exceeds said predetermined time unit.

4. The method of claim 1, further comprising the steps of:

dividing the time duration of said first viewing status into a predetermined number of category time durations corresponding to a predetermined number of categories of television programming;

adding the category time durations of said first viewing status to a predetermined number of corresponding category viewing time counters in said viewer profile listing if said first viewing status is in said viewer profile listing; and adding said first viewing status and the category time durations of said first viewing status to the corresponding category viewing time counters in said viewer profile listing if said first viewing status is not in said viewer profile listing.

5. The method of claim 1, wherein said step of determining the time duration of a first viewing status comprises the steps of:

storing a starting time for a first viewing status;

storing a starting time for a second viewing status; and determining the time duration of said first viewing status by subtracting the starting time for said first viewing status from the starting time for said second viewing status.

6. The method of claim 1, wherein said step of determining the time duration of a first viewing status comprises the steps of:

initiating a timer at a starting time for said first viewing status; and determining the time duration of said first viewing status in accordance with said timer.

7. An apparatus for monitoring viewing behavior, comprising:

means for establishing a viewer profile listing for storing a predetermined number of preferred viewing statuses;

means for calculating a time duration of a first viewing status;

means for determining whether said first viewing status is included in said viewer profile listing;

means for adding the time duration of said first viewing status to a total viewing time counter for said first viewing status in said viewer profile listing if said first viewing status is included in said viewer profile listing; and means for adding said first viewing status and said time duration of said first viewing status to said viewer profile listing if said first viewing status is not included in said viewer profile listing.

8. The apparatus of claim 7, further comprising:

means for removing a least preferred viewing status from said viewer profile listing if said viewer profile listing is full when said first viewing status is to be added to said viewer profile listing.

9. The apparatus of claim 7, further comprising:

means for comparing the time duration of said first viewing status to a predetermined time unit; and means for adding the time duration of said first viewing status to said viewer profile listing only if said time duration exceeds said predetermined time unit.

10. The apparatus of claim 7, further comprising:

means for dividing the time duration of said first viewing status into a predetermined number of category time durations corresponding to a predetermined number of categories of television programming;

means for adding the category time durations of said first viewing status to a predetermined number of corresponding category viewing time counters in said viewer profile listing if said first viewing status is in said viewer profile listing; and means for adding said first viewing status and the category time durations of said first viewing status to the corresponding category viewing time counters in said viewer profile listing if said first viewing status is not in said viewer profile listing.

11. A computer-readable medium which can be used to direct a computer to monitor viewing behavior, comprising:

means for directing the computer to establish a viewer profile listing for storing a predetermined number of preferred viewing statuses;

means for directing the computer to calculate a time duration of a first viewing status;

means for directing the computer to determine whether said first viewing status is included in said viewer profile listing;

means for directing the computer to add the time duration of said first viewing status to a total viewing time counter for said first viewing status in said viewer profile listing if said first viewing status is included in said viewer profile listing; and means for directing the computer to add said first viewing status and said time duration of said first viewing status to said viewer profile listing if said first viewing status is not included in said viewer profile listing.

12. The computer-readable medium of claim 11, further comprising:

means for directing the computer to remove a least preferred viewing status from said viewer profile listing if said viewer profile listing is full when said first viewing status is to be added to said viewer profile listing.

13. The computer-readable medium of claim 11, further comprising:

means for directing the computer to compare the time duration of said first viewing status to a predetermined time unit; and means for directing the computer to add the time duration of said first viewing status to said viewer profile listing only if said time duration exceeds said predetermined time unit.

14. The computer-readable medium of claim 11, further comprising:

means for directing the computer to divide the time duration of said first viewing status into a predetermined number of category time durations corresponding to a predetermined number of categories of television programming;

means for directing the computer to add the category time durations of said first viewing status to a predetermined number of corresponding category viewing time counters in said viewer profile listing if said first viewing status is in said viewer profile listing; and means for directing the computer to add said first viewing status and the category time durations of said first viewing status to the corresponding category viewing time counters in said viewer profile listing if said first viewing status is not in said viewer profile listing.

15. A method for displaying program guide information on the screen of a television, comprising the steps of:

monitoring the viewing behavior of a viewer;

determining at least one preferred viewing status of the viewer in accordance with the viewing behavior of the viewer;

configuring the program guide information in accordance with said at least one preferred viewing status of the viewer; and displaying the configured program guide information on the screen of the television;

wherein the step of monitoring comprises the steps of:
establishing a viewer profile listing for storing a predetermined number of viewing statuses;
calculating a time duration of a first viewing status;
determining whether said first viewing status is included in said viewer profile listing;
adding the time duration of said first viewing status to a total viewing time counter for said first viewing status in said viewer profile listing if said first viewing status is included in said viewer profile listing; and
adding said first viewing status and said time duration of said first viewing status to said viewer profile listing if said first viewing status is not included in said viewer profile listing.

16. In a set-top unit adapted for coupling to a television, an apparatus for displaying program guide information on a screen of a television, said apparatus comprising:

means for monitoring television viewing behavior in order to determine viewer channel preferences, said monitoring means comprising,
means for establishing a viewer profile listing for storing a predetermined number of preferred channels;
means for calculating a time duration for which a first channel is viewed;
means for determining whether said first channel is included in said viewer profile listing;
means for adding the time duration said first channel is viewed to a total viewing time counter for said first channel in said viewer profile listing if said first channel is included in said viewer profile listing; and
means for adding said first channel and said time duration said first channel is viewed to said viewer profile listing if said first channel is not included in said viewer profile listing;

means for determining the preferred channels of the viewer in accordance with the viewing behavior of the viewer;

means for configuring the program guide information in accordance with the preferred channels of the viewer; and means for displaying the configured program guide information on the screen of the television.

17. The apparatus of claim 16 wherein said monitoring means further comprises:

means for dividing the time duration for which said first channel is viewed into a predetermined number of category time durations corresponding to a predetermined number of categories of television programming;

means for adding the category time durations of said first channel to a predetermined number of corresponding category viewing time counters in said viewer profile listing if said first channel is in said viewer profile listing; and means for adding said first channel and the category time durations of said first channel to the corresponding category viewing time counters in said viewer profile listing if said first channel is not in said viewer profile listing.

* * * * *